United States Patent [19]
Scott et al.

[11] Patent Number: 5,869,754
[45] Date of Patent: Feb. 9, 1999

[54] DUAL SEAL COUPLING APPARATUS FOR ENABLING QUICK MEASUREMENT OF BRAKE CYLINDER PRESSURE

[75] Inventors: Daniel G. Scott, Pittsburgh; Gregory L. Johnston, Tarentum, both of Pa.

[73] Assignee: Westinghouse Air Brake Company, Wilmerding, Pa.

[21] Appl. No.: 901,606

[22] Filed: Jul. 28, 1997

[51] Int. Cl.$^6$ ...................................................... G01L 5/28
[52] U.S. Cl. .............................................................. 73/121
[58] Field of Search .............................. 73/706, 707, 121, 73/129, 756; 137/599.2, 560, 561 R, 625, 625.18; 251/360, 363; 303/79, 3, 15, 20; 210/130, 131, 132, 133, 136, 137, 97, 541; 422/256, 257, 258, 259, 260

[56] References Cited

U.S. PATENT DOCUMENTS

| | | | |
|---|---|---|---|
| 3,794,071 | 2/1974 | Scott | 137/599.2 |
| 4,869,557 | 9/1989 | Gerum et al. | 303/3 |

*Primary Examiner*—William Oen
*Attorney, Agent, or Firm*—James Ray & Associates

[57] ABSTRACT

A dual seal coupling apparatus enables quick measurement of brake cylinder pressure through a receiver assembly of a control valve. The receiver assembly has a receiver body, a check valve housed in the body and a cover whose removal renders the check valve accessible. The check valve is normally compressed against a check valve seat to provide a first seal that prevents leakage of the pressure. When moved away from its seat, the check valve provides access to the pressure. The apparatus includes a boss that protrudes from the cover and a male portion of a quick connect coupling. The boss defines a threaded bore aligned with the check valve when the cover is secured to the receiver body. The male portion includes a valve body and a valve stem. The valve body defines a valve bore and has a threaded end for screwing into the threaded bore of the cover. At its opposite end, the valve body is shaped to mate with a female portion of the quick connect coupling. The valve stem moves within the bores and its head is normally compressed against a valve stem seat. The head of the valve stem against the valve stem seat provides a second seal that further prevents leakage of the pressure. When the male and female portions are mated, the valve stem is moved away from its seat thereby moving the check valve away from its seat and providing access to and enabling measurement of the brake cylinder pressure.

14 Claims, 5 Drawing Sheets

DUAL SEAL COUPLING APPARATUS FOR ENABLING QUICK MEASUREMENT OF BRAKE CYLINDER PRESSURE

CROSS-REFERENCE TO RELATED APPLICATIONS

This application is related to a copending U.S. application entitled Dual Seal Fitting For Enabling Quick Measurement Of Brake Cylinder Pressure, Ser. No. 08/901,096, filed currently herewith on Jul. 28, 1997. The copending application is assigned to the assignee of the present invention, and its teachings are incorporated into this document by reference.

FIELD OF THE INVENTION

The present invention generally relates to a mechanism through which to gain access to a pressure to be measured. More particularly, the invention relates to an apparatus that allows quick measurement of brake cylinder pressure through a receiver assembly of a pneumatic control valve of a railcar.

BACKGROUND OF THE INVENTION

A typical freight train includes one or more locomotives, a plurality of railcars and a pneumatic trainline referred to as the brake pipe. The brake pipe consists of a series of individual pipe lengths interconnected to each other. One pipe length secured to the underside of each railcar interconnects to another such pipe length via a flexible coupler situated between each railcar. The brake pipe supplies the pressurized air that is required by the brake control system to charge the various reservoirs and operate the air brake equipment on each railcar in the freight train.

A train operator situated in the lead locomotive can manipulate a brake handle to apply and release the brakes on the railcars as desired. The brake handle can be moved from and in between a release position at one extreme in which brake pipe pressure is maximum and the brakes are completely released to an emergency position at another extreme in which brake pipe pressure is minimal and the brakes are fully applied. The brake handle positions thus include brake release, minimum service brake application, full service brake application and emergency brake application. When the brakes are released, the reservoirs and the brake pipe are generally charged to the same pressure: typically 90 psi on a freight train and 110 psi on a passenger train. When the brakes are applied, the pressure in the brake pipe is reduced via a valve located in the lead locomotive. The exact amount by which the pressure is reduced depends into which of the application positions the brake handle is placed. It is this pressure reduction that signals the brake control valve on each railcar to supply pressurized air from the appropriate reservoir(s) to the brake cylinders. The brake cylinders convert this pressure to the mechanical force which the brake shoes apply to slow or stop the rotation of the wheels on the railcar. Assuming the brake signal is successfully communicated throughout the train, the brakes of all railcars in the train respond in generally the same manner.

The brake equipment on each railcar of a freight train typically includes one or more brake cylinders, an emergency air reservoir, an auxiliary air reservoir and a conventional pneumatic brake control system such as an "ABD" or similar type control valve. Each railcar may also include empty and load freight brake equipment such as a P-1 Load Proportional Valve and an S-1 Load Sensor Valve both of which are made by the Westinghouse Air Brake Company (WABCO) and are known in the brake control art.

Figure 1A:
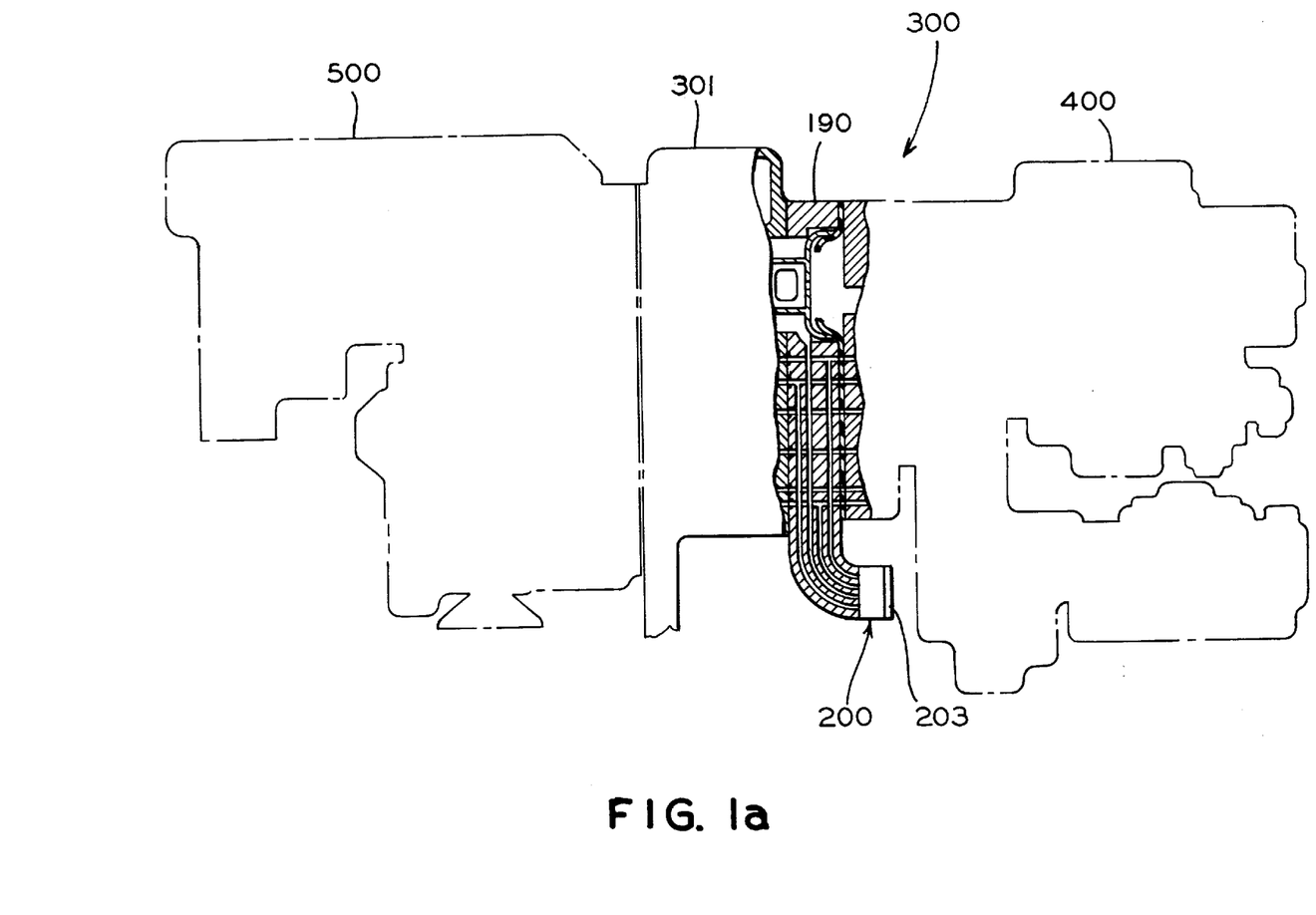
FIG. 1a is a schematic diagram of an ABD type pneumatic brake control valve featuring an access and receiver assembly.

FIG. 1a illustrates a schematic diagram of an ABD type pneumatic brake control valve. This control valve includes a service portion and an emergency portion typically mounted on opposite sides of a pipe bracket. It should be noted that there exists at least one other type of pipe bracket on which the service and emergency portions are mounted on the same side. Whether dealing with the dual sided or single sided variety, the pipe bracket features a number of internal passages and several ports. Each port connects to one of the interconnecting pipes from the railcar such as those leading to the brake pipe, the brake cylinder, the emergency reservoir and the auxiliary reservoir. It is through these ports and internal passages of the pipe bracket that the relevant portions of the control valve communicate fluidly with the pneumatic piping on the railcar.

The service and emergency portions of the pneumatic control valve operate according to principles well known in the railroad industry. The service portion of the control valve performs several functions including (1) controlling the flow of air from the auxiliary reservoir to the brake cylinder during a service brake application, (2) controlling the recharging of the auxiliary and emergency reservoirs, and (3) controlling the exhausting of the brake cylinder when the brakes are released. The emergency portion of the control valve controls, among other things, the flow of air from both reservoirs to the brake cylinder during an emergency brake application.

The American Association of Railroads (A.A.R.) has issued specification S-486-91 detailing the basic test procedures that must be performed periodically on the brake equipment of every railcar. It requires that the brake equipment be charged and tested for leaks. There exists a standard A.A.R. test device that can be used to perform such testing, but it is rather complicated and requires interpretation by a very skilled user to identify problems with the brake equipment. Accordingly, in U.S. application Ser. No. 08/365,815, WABCO has described and claimed an Automated Single Car Tester that can perform the requisite tests more reliably and quickly than the standard A.A.R. Test device. This copending application is assigned to the assignee of the present invention, and its teachings are incorporated into this document by reference.

Figure 1B:
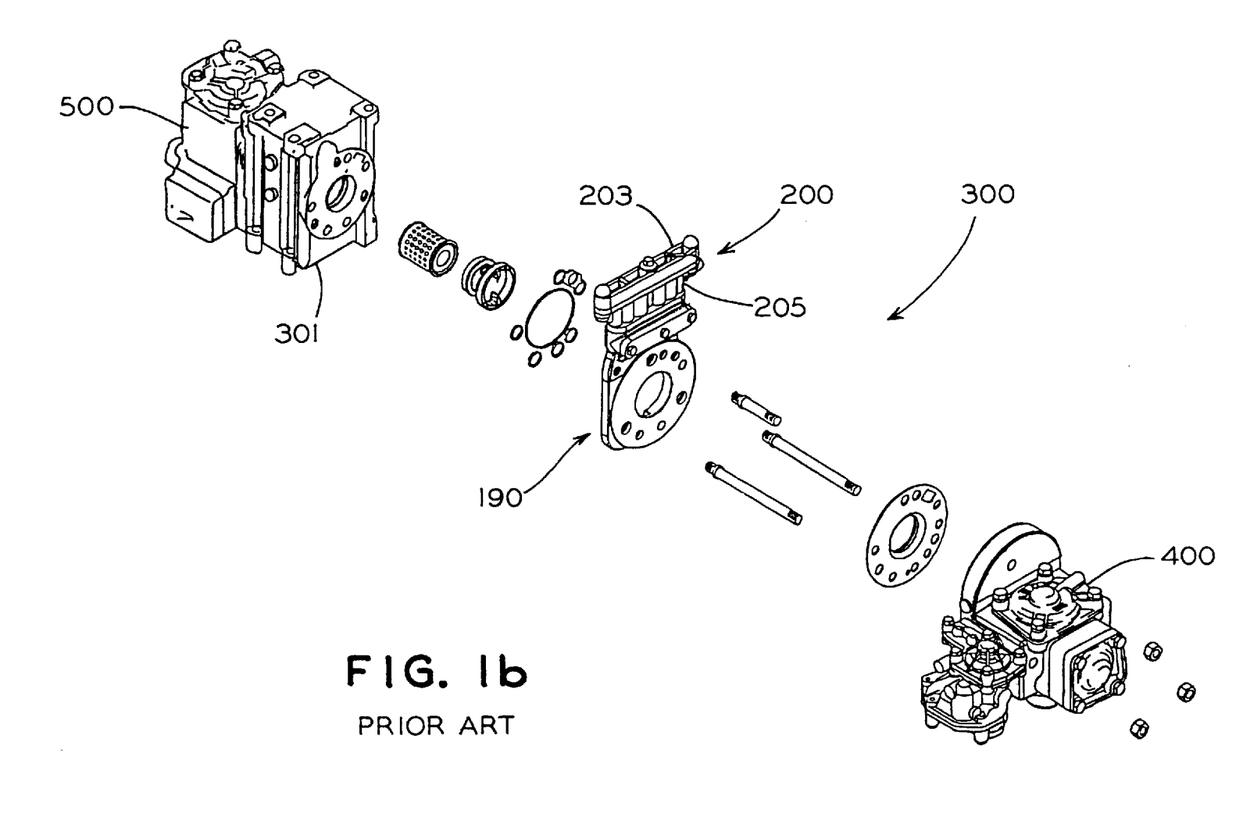
Figure 1C:
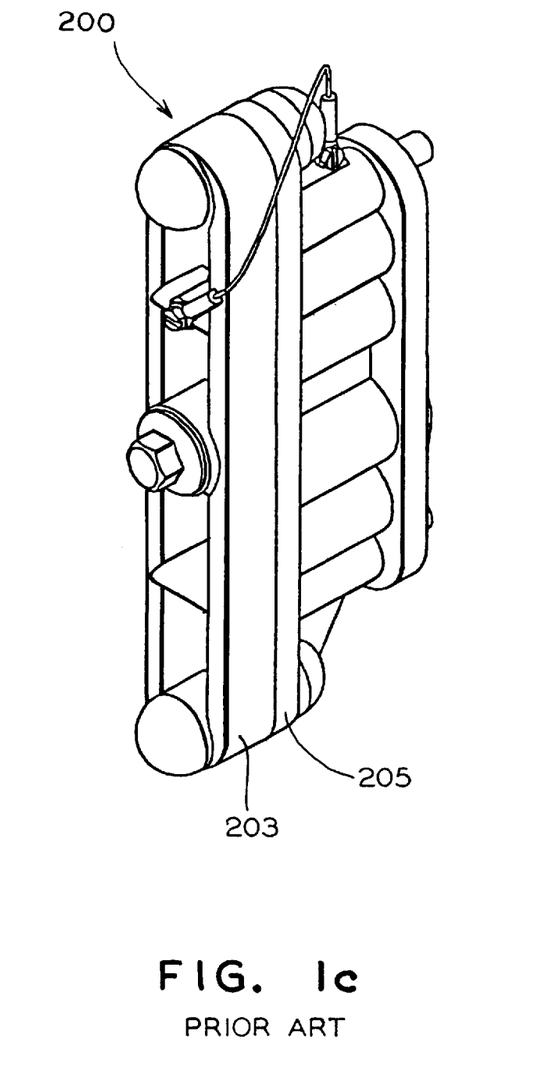
FIG. 1c is an enlarged perspective view of the receiver assembly illustrated in FIGS. 1a and 1b.
Figure 1D:
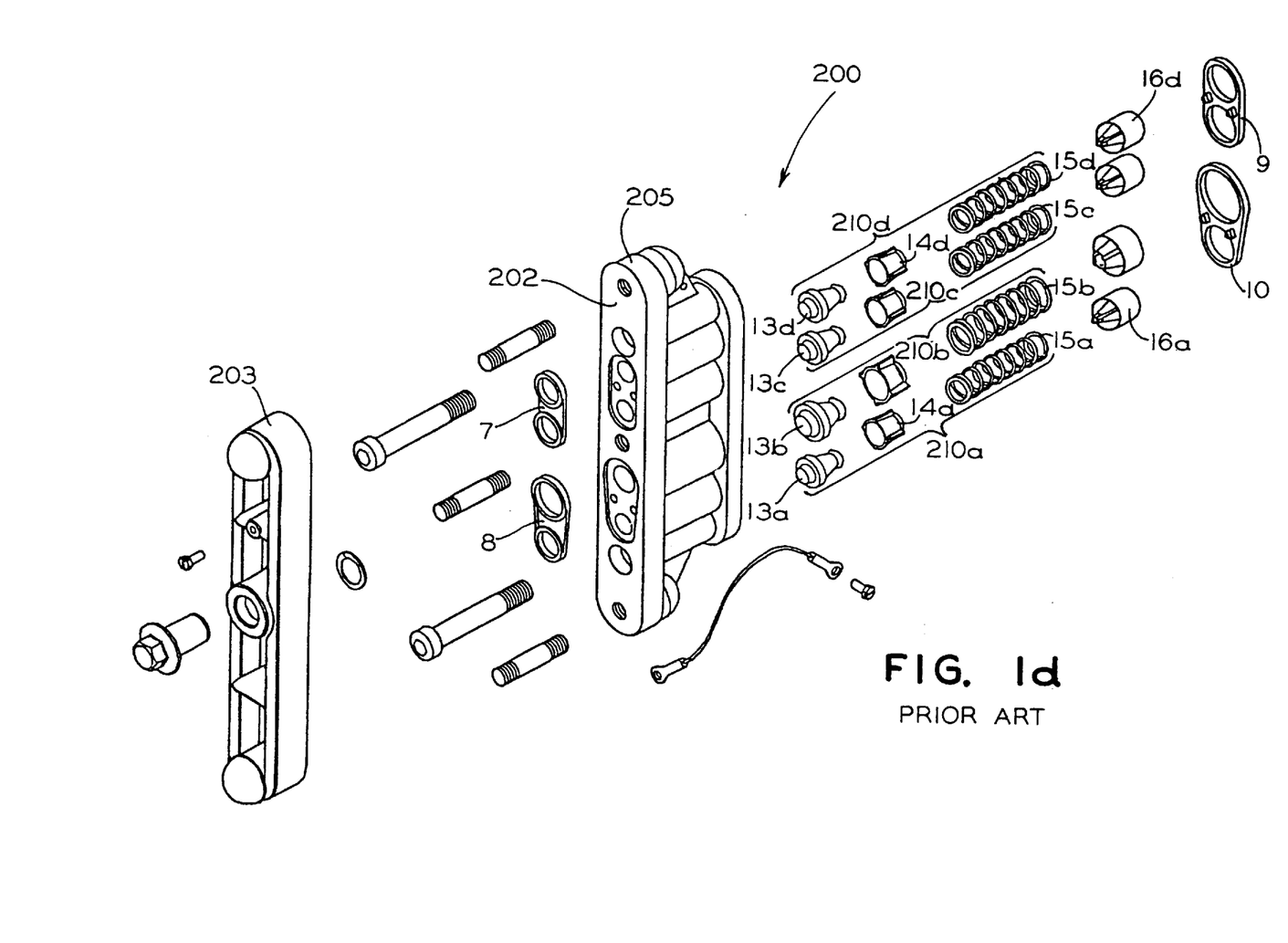
FIG. 1d is an exploded view of the receiver assembly illustrated in FIG. 1c.

Among other functions, the Automated Single Car Tester is used to measure the pressure at various points within the brake control system of the railcar. The single sided pipe bracket has a receiver assembly mounted to same side of the pipe bracket to which the service and emergency portions of the control valve mount. This receiver assembly provides the Automated Single Car Tester with quick and direct access to certain internal passageways of the pipe bracket and ultimately the pneumatic pipes and reservoirs whose pressure must be tested. Specifically, through the receiver assembly, the Automated Single Car Tester can measure pressure within the brake cylinder, the brake pipe, the emergency reservoir and the auxiliary reservoir. The dual sided pipe bracket, however, has its ports located on its rear side. Consequently, it is quite difficult to access the ports and the pipes that connect to them. Therefore, for railcars equipped with the dual sided pipe bracket, the Automated Single Car Tester is used in conjunction with a combination access and receiver assembly. This access plate portion of the assembly is typically connected between the pipe bracket and the service portion of the control valve as shown in FIGS. 1a and 1b. The receiver portion is assembled as shown in FIG. 1d. Connected to form the combined assembly as shown in FIG. 1b, the receiver portion together with the access plate provide access to the internal passageways of the pipe bracket. For railcars equipped with the dual sided pipe bracket, the combined assembly is the part through which the Automated Single Car Tester can measure the pressure within the brake cylinder, the brake pipe, the emergency reservoir and the auxiliary reservoir.

As will be apparent from the ensuing description and claims, the receiver portion and the receiver assembly of the two aforementioned pipe brackets are identical except in respects immaterial to the present invention. It is for this reason that the terms "receiver assembly" and "receiver portion" shall hereinafter be used interchangeably.

As shown in FIG. 1d, the receiver assembly includes a cover, a receiver body and four check valves housed in bores defined in the receiver body. Each check valve basically includes a shaped insert made of rubber or other suitable sealing material, a carrier that holds the shaped insert and a spring. A gasket and typically a filter are also used with each check valve. Consequently, each check valve is normally compressed against a check valve seat formed at the top of its bore. When the receiver assembly is mounted to the control valve, the check valves, at the head of the receiver body, are accessible by removal of the cover. Each check valve serves as an access port through which to access the pressure held in one of the following devices: the brake cylinder, the brake pipe and the emergency and auxiliary reservoirs. Even with the cover removed, each check valve acts as a seal that prevents leakage of the air under pressure.

The Automated Single Car Tester includes a pneumatic connector designed to mate with the head of the receiver body and thereby to each of the four access ports. By moving each check valve away from its check valve seat, the tester can charge and measure the pressure within the brake cylinder, the brake pipe, the emergency reservoir and/or the auxiliary reservoir.

The A.A.R. has proposed that each railcar of a freight train be provided with a mechanism that would allow the pressure within the brake cylinder to be read quickly. At present, the A.A.R. is considering whether to issue a specification requiring that a commercially available quick connect type fitting be used to access the pressure within the brake cylinder. The disadvantage of such a fitting, however, is that it provides only a single seal with which to contain the pressure to be measured. That is, while such a fitting is not being used to access the pressure, it offers only one seal to prevent leakage of the pressure that it is supposed to contain. Unless the fitting is routinely covered to protect the seal when the fitting is not being used to access the brake cylinder pressure, the seal is exposed to dust, dirt and/or other potential contaminants. It is, of course, important that such a fitting prevent leakage of pressure from the brake cylinder otherwise operation of the brakes may be adversely affected.

It should be noted that the foregoing background information is provided to assist the reader in understanding the instant invention. Accordingly, any terms used herein are not intended to be limited to any particular narrow interpretation unless specifically stated otherwise in this document.

OBJECTIVES OF THE INVENTION

It is, therefore, a primary objective of the invention to provide an apparatus that allows the pressure within a brake cylinder of a railcar to be measured quickly.

Another objective is to render the pressure within the brake cylinder quickly measurable with an apparatus that features two seals so if one seal should leak the other seal will prevent leakage of the air that the apparatus is supposed to contain.

Yet another objective is to endow such apparatus with a male portion of a commercially available quick connect fitting so that the pressure within the brake cylinder can be measured quickly by mating the male portion with a corresponding female portion which has attached at its other end a pressure measuring device.

Still another objective of the invention is to provide such a dual seal coupling apparatus to enable quick measurement of pressure within any one of the brake cylinder, the brake pipe, the emergency reservoir and the auxiliary reservoir on a railcar.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the attached drawings and with the appended claims.

SUMMARY OF THE INVENTION

In a presently preferred embodiment, the present invention provides a dual seal coupling apparatus for enabling quick measurement of brake cylinder pressure through a receiver assembly of a pneumatic control valve of a railcar. The receiver assembly has a cover, a receiver body and at least one check valve housed in the receiver body. The check valve is accessible by removal of the cover. The check valve is normally compressed against a check valve seat formed in the receiver body to provide a first seal that prevents leakage of the pressure. When moved away from the check valve seat, the check valve provides access to the brake cylinder pressure. The dual seal coupling apparatus includes a boss that protrudes from the cover of the receiver body and a male portion of a quick connect coupling. The boss defines through itself a threaded bore aligned generally axially with the check valve when the cover is secured to the receiver body. The male portion of the quick connect coupling includes a valve body and a valve stem. The valve body defines through itself a valve bore and has a threaded end for screwing into the threaded bore of the cover. At its opposite end, the valve body is shaped to mate with a female portion of the quick connect coupling. The valve stem moves within the bores and has a head end that is normally compressed against a valve stem seat formed in the valve body. The head end of the valve stem against the valve stem seat provides a second seal that further prevents leakage of the brake cylinder pressure. When the female portion is mated with the male portion, the valve stem is moved away from the valve stem seat thereby moving the check valve away from the check valve seat and providing access to and enabling measurement of the brake cylinder pressure.

BRIEF DESCRIPTION OF THE DRAWINGS

FIG. 1b is an exploded view of the ABD type pneumatic brake control valve illustrated in FIG. 1a.

DETAILED DESCRIPTION OF THE INVENTION

Before describing the invention in detail, the reader is advised that, for the sake of clarity and understanding, identical components having identical functions in each of the accompanying drawings have been marked where possible with the same reference numerals in each of the FIGS. provided in this document.

FIGS. 1a–d each illustrate a receiver assembly 200 of a pneumatic control valve 300 of a railcar. The control valve 300 includes a service portion 400 and an emergency portion 500 mounted to a pipe bracket 301. Though FIGS. 1a and 1b show the receiver portion 200 of the access and receiver assembly 190 used in connection with the dual sided pipe bracket 301, it is again noted that in this document the term "receiver assembly" also encompasses the receiver assembly used in connection with the aforementioned single sided pipe bracket (not shown).

The receiver assembly 200 includes a cover 203, a receiver body 205 and four check valves 210a–d housed in bores defined in the receiver body 205. As best shown in FIG. 1d, each check valve basically includes a shaped insert 13a–d made of rubber or other suitable sealing material, a carrier 14a–d that holds the shaped insert and a spring 15a–d. Gaskets 7–10 and filters 16a–d are also used with the check valves. Consequently, each check valve is normally compressed against a check valve seat formed at or near the top of its bore. When the receiver assembly 200 is mounted to the control valve 300 as indicated in FIGS. 1b and 1d, for example, the check valves, at the head 202 of the receiver body 205, are accessible by removal of the cover 203. Check valve 210a serves as the access port through which to access the pressure in the brake cylinder. Check valve 210b serves as the access port through which to access the pressure in the brake pipe. Check valves 210c and 210d serve as the access ports through which to access the pressure in the auxiliary and emergency reservoirs, respectively. Each check valve acts as a seal that prevents leakage of the air pressure that it is intended to contain, even with cover 203 removed. The gaskets 7 and 8 serve as a supplement to the seal provided by each of the check valves 210a–d.

Figure 2:
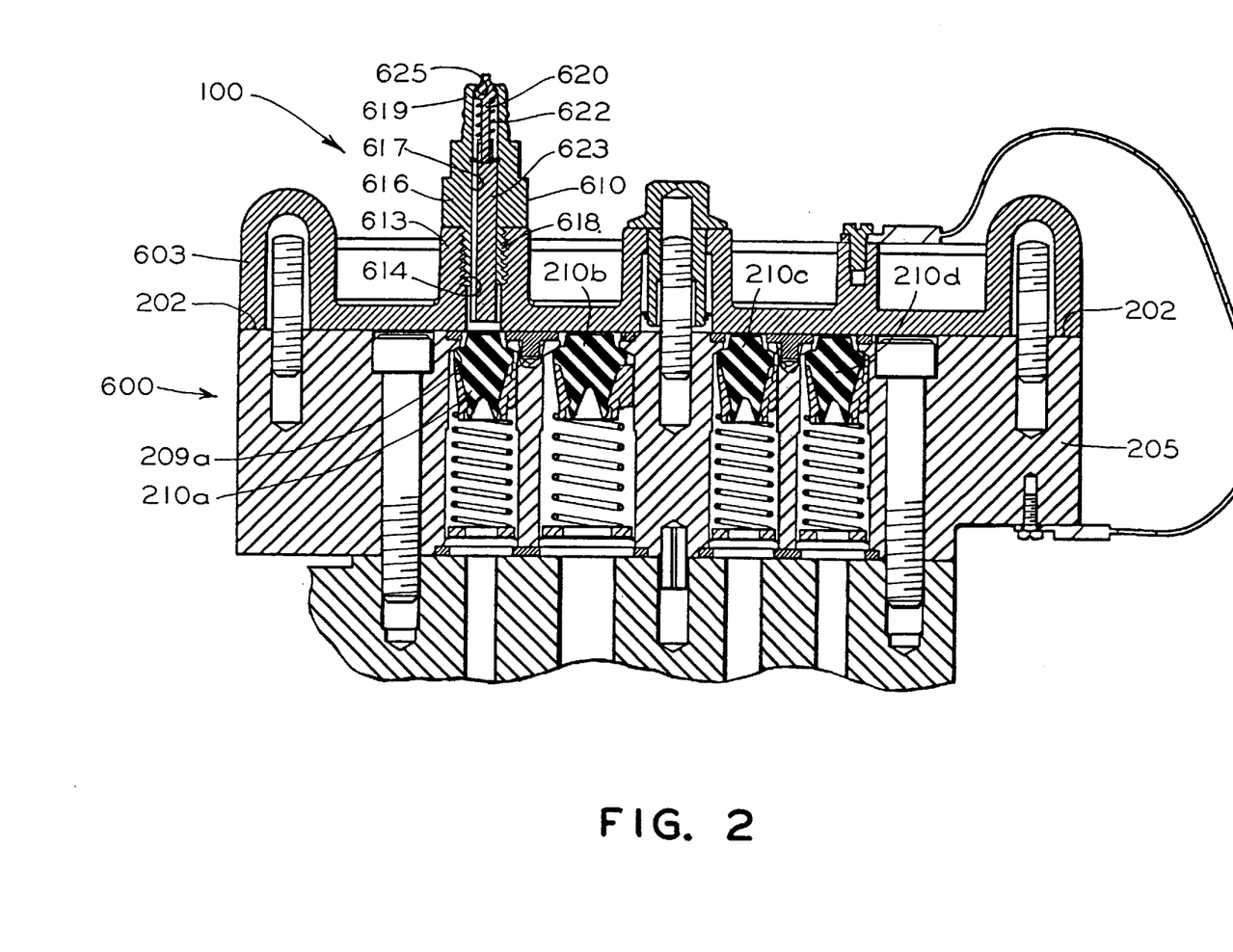
FIG. 2 is a cross sectional view of a receiver assembly incorporating the dual seal coupling apparatus according to the present invention.

FIG. 2 illustrates the essential details of a presently preferred embodiment of a dual seal coupling apparatus 100. The dual seal coupling apparatus 100 enables quick measurement of the brake cylinder pressure through a modified receiver assembly 600 of the pneumatic control valve 300 of the railcar. The receiver assembly 600 of the present invention is generally identical to the receiver assembly 200 shown in FIGS. 1a–d, except for the cover 603 illustrated in FIG. 2 and described below.

The dual seal coupling apparatus 100 includes the modified receiver assembly 600 and a male portion 610 of a quick connect coupling. The modified receiver assembly 600 includes the receiver body 205 and the four check valves 210a–d disposed in generally the same manner as in the prior art receiver assembly 200. The cover 603 of the modified receiver assembly 600, however, features a boss 613 protruding from the cover. The boss 613 defines through itself a cylindrical bore 614 whose wall is at least partially threaded so as to receive a threaded end 618 of the male portion 610 of the quick connect coupling. The threaded bore 614 is aligned generally axially with check valve 210a when the cover 603 is secured by bolts or other means to receiver body 205.

The male portion 610 of the quick connect coupling features a valve body, a valve stem piece and an extension. The valve body 616 defines through itself a valve bore 617 and includes the threaded end 618 that screws into the threaded bore 614 of the cover 603. The valve body 616 at its opposite end 619 is shaped to be mated to a corresponding female portion (not shown) of the quick connect coupling. It should be noted that there are a variety of quick connect couplings commercially available in the market place. Especially with regard to the threaded end 618, the size and dimensions of the particular quick connect coupling to be used with the present invention should be selected with due regard for the size and dimensions of the cover 603 and its boss 613.

The valve stem piece 620 of the male portion 610 has at its head end preferably a poppet type valve 621 that is movable within the valve bore 617. The poppet valve of the valve stem piece is normally compressed by a spring 622 against a valve stem seat 625 formed in head end of the valve body 616. The extension 623 is situated between the opposite end of the valve stem piece 620 and the top of the brake cylinder pressure check valve 210a. Consequently, when the female portion of the quick connect coupling is mated with the male portion 610, the poppet valve 621 is moved away from the valve stem seat 625. The valve stem piece 620 thus pushes against the extension 623. The extension 623 then pushes against the check valve 210a thereby moving the check valve away from its check valve seat 209a. The mating of the male and female portions of the quick connect coupling thus provide access to the pressure in the brake cylinder. This enables quick measurement of the pressure via a pressure measuring device attached Lo the opposing end of the female portion of the quick connect coupling.

The extension 623 preferably has grooves along its length so as to be fluted in cross section in a plane normal to the longitudinal axis of the extension in FIG. 2. The grooves should allow the air to flow more smoothly through the male portion 610 than would be the case in the absence of such grooves.

It should be apparent that the male and female portions of the quick connect coupling may be switched. Specifically, the female portion, rather than the male portion, of the coupling may be designed to screw into or otherwise secure within the boss 613 of the cover 603. The male portion, rather than the female portion, of the quick connect coupling would then be attached at its opposite end to the pressure measuring device.

It should also be apparent that the dual seal coupling apparatus 100 described herein can be applied not only to the brake cylinder check valve 210a but to any one or more of the other check valves 210b–d. Only the cover 603 need be modified in much the same manner as described above for boss 613 to accomplish this objective. From FIG. 1d it can be observed that certain of the check valves bores have diameters different than the diameter of brake cylinder check valve 210a. Consequently, the cover 603 will have to be designed to accommodate one or more bosses of different diameters. The threaded end(s) of the male portion that screw into these bosses must, of course, be dimensioned accordingly. Depending on how extensively the cover 603 is modified, the dual seal coupling apparatus of this invention can be used to enable a quick measurement of pressure within the brake cylinder, the brake pipe, the emergency reservoir and/or the auxiliary reservoir.

The dual seal coupling apparatus 100 thus features both a primary seal and a backup seal to prevent leakage of the brake cylinder pressure when the male portion 610 of the quick connect coupling sits unmated. Normally compressed against the valve stem seat 625, the poppet type valve 621 serves as the primary seal as its position renders it most exposed to dust, dirt and/or other potential contaminants. Similarly, the check valve 210*a* lies normally compressed against its check valve seat 209*a*. Check valve 210*a* thus provides a seal that serves as a backup to the primary seal should the primary seal succumb to such contaminants or otherwise degrade. Conversely, should the check valve seal degrade, the poppet valve seal acts as the backup seal.

The dual seal coupling apparatus 100 allows the pressure within the brake cylinder to be measured quickly. Even though the invention renders the brake cylinder pressure amenable to quick measurement, it maintains the overall integrity of the air brake equipment on the railcar by the primary and redundant seals that prevent leakage of air from the brake cylinder.

The presently preferred embodiment for carrying out the invention has been set forth in detail according to the Patent Act. Those persons of ordinary skill in the art to which this invention pertains may nevertheless recognize various alternative ways of practicing the invention without departing from the spirit and scope of the appended claims. Those of such skill will also recognize that the foregoing description is merely illustrative and not intended to limit any of the ensuing claims to any particular narrow interpretation.

Accordingly, to promote the progress of science and useful arts, we secure for ourselves by Letters Patent exclusive rights to all subject matter embraced by the following claims for the time prescribed by the Patent Act.

We claim:

1. A dual seal coupling apparatus for enabling quick measurement of pressure through a receiver assembly of a control valve of a railcar, such receiver assembly having a cover, a receiver body and at least one check valve housed in such receiver body wherein such check valve is accessible by removal of such cover, such check valve being normally compressed against a check valve seat formed in such receiver body to provide a first seal that prevents leakage of such pressure and when moved away from such check valve seat provides access to such pressure, said apparatus comprising:
    (a) said cover of such receiver assembly defining therethrough a threaded bore aligned generally axially with such check valve when said cover is secured to such receiver body; and
    (b) a male portion of a quick connect coupling, said male portion including (i) a valve body defining therethrough a valve bore and having a threaded end for screwing into said threaded bore and an opposite end for mating with a female portion of such quick connect coupling and (ii) a valve stem movable within said bores with a head end thereof normally compressed against a valve stem seat formed in said valve body to provide a second seal that further prevents leakage of such pressure, but when such female portion is mated with said male portion, said valve stem is moved away from said valve stem seat thereby moving such check valve away from such check valve seat and providing access to and enabling measurement of such pressure.

2. The dual seal coupling apparatus recited in claim 1 wherein said valve stem has a fluted cross section.

3. The dual seal coupling apparatus recited in claim 1 wherein said valve stem includes:
    (a) a valve stem piece having at said head end thereof a poppet valve that is spring loaded against said valve stem seat; and
    (b) an extension situated between an opposite end of said valve stem piece and such check valve such that when such female portion is mated with said male portion, said poppet valve is moved away from said valve stem seat and said valve stem piece pushes against said extension thereby moving such check valve away from such check valve seat and providing access to such pressure and enabling quick measurement thereof via a pressure measuring device attached to an opposing end of such female portion.

4. The dual seal coupling apparatus recited in claim 3 wherein said extension has a fluted cross section.

5. The dual seal coupling apparatus recited in claim 1 wherein such pressure is at least one of brake cylinder pressure, brake pipe pressure, emergency reservoir pressure and auxiliary reservoir pressure.

6. The dual seal coupling apparatus recited in claim 5 wherein such pressure is such brake cylinder pressure.

7. A dual seal coupling apparatus for enabling quick measurement of pressure through a receiver assembly of a control valve of a railcar, such receiver assembly having a cover, a receiver body and at least one check valve housed in such receiver body wherein such check valve is accessible by removal of such cover, such check valve being normally compressed against a check valve seat formed in such receiver body to provide a first seal that prevents leakage of such pressure and when moved away from such check valve seat provides access to such pressure, said apparatus comprising:
    (a) said cover of such receiver assembly defining therethrough a threaded bore aligned generally axially with such check valve when said cover is secured to such receiver body; and
    (b) a male portion of a quick connect coupling, said male portion including (i) a valve body defining therethrough a valve bore and having a threaded end for screwing into said threaded bore and an opposite end for mating with a female portion of such quick connect coupling, (ii) a valve stem piece having at a head end thereof a poppet valve movable within said valve bore that is normally compressed against a valve stem seat formed in said valve body to provide a second seal that further prevents leakage of such pressure, and (iii) an extension situated between an opposite end of said valve stem piece and such check valve such that when such female portion is mated with said male portion, said poppet valve is moved away from said valve stem seat and said valve stem piece pushes against said extension thereby moving such check valve away from such check valve seat and providing access to and enabling quick measurement of such pressure via a pressure measuring device attached to an opposing end of such female portion.

8. The dual seal coupling apparatus recited in claim 7 wherein said extension has a fluted cross section.

9. The dual seal coupling apparatus recited in claim 7 wherein such pressure is at least one of brake cylinder pressure, brake pipe pressure, emergency reservoir pressure and auxiliary reservoir pressure.

10. The dual seal coupling apparatus recited in claim 9 wherein such pressure is such brake cylinder pressure.

11. A dual seal coupling apparatus for enabling quick measurement of pressure through a receiver assembly of a control valve of a railcar, such receiver assembly having a cover, a receiver body and at least one check valve housed in such receiver body wherein such check valve is accessible by removal of such cover, such check valve being normally compressed against a check valve seat formed in such receiver body to provide a first seal that prevents leakage of such pressure and when moved away from such check valve seat provides access to such pressure, said apparatus comprising:

(a) a boss protruding from said cover of such receiver assembly and defining therethrough a threaded bore aligned generally axially with such check valve when said cover is secured to such receiver body; and     (b) a first portion of a quick connect coupling, said first portion including (i) a valve body defining therethrough a valve bore and having a threaded end for screwing into said threaded bore and an opposite end for mating with a second portion of said quick connect coupling, (ii) a valve stem piece having at a head end thereof a poppet valve movable within said valve bore that is normally compressed against a valve stem seat formed in said valve body to provide a second seal that further prevents leakage of such pressure, and (iii) an extension situated between an opposite end of said valve stem piece and such check valve such that when said first and said second portions are mated, said poppet valve is moved away from said valve stem seat and said valve stem piece pushes against said extension thereby moving such check valve away from such check valve seat and providing access to and enabling quick measurement of such pressure via a pressure measuring device attached to an opposing end of such second portion.

12. The dual seal coupling apparatus recited in claim 11 wherein said extension has a fluted cross section.

13. The dual seal coupling apparatus recited in claim 11 wherein such pressure is at least one of brake cylinder pressure, brake pipe pressure, emergency reservoir pressure and auxiliary reservoir pressure.

14. The dual seal coupling apparatus recited in claim 13 wherein such pressure is such brake cylinder pressure.

\* \* \* \* \*